United States Patent [19]

Kinoshita et al.

[11] Patent Number: 5,432,842
[45] Date of Patent: Jul. 11, 1995

[54] MOBILE COMMUNICATION SWITCHING ACROSS CELL BOUNDARIES

[75] Inventors: Yasuaki Kinoshita, Hachioji; Arata Nakagoshi; Hideya Suzuki, both of Kokubunji; Hideo Nakasawa, Hoya; Yukinari Fujiwara, Musashimurayama; Michiaki Kurosawa, Naka-minato, all of Japan

[73] Assignee: Hitachi, Ltd., Tokyo, Japan

[21] Appl. No.: 852,810

[22] Filed: Mar. 17, 1992

[30] Foreign Application Priority Data

Mar. 19, 1991 [JP] Japan .................. 3-054322

[51] Int. Cl.$^6$ .............................. H04Q 7/38
[52] U.S. Cl. ...................... 379/60; 455/33.2; 455/33.4
[58] Field of Search .................. 379/59, 60; 455/33.1–33.4, 56.1; 342/357, 457

[56] References Cited

U.S. PATENT DOCUMENTS

| | | | |
|---|---|---|---|
| 3,764,915 | 10/1973 | Cox et al. | 379/58 |
| 4,667,202 | 5/1987 | Kammerlander et al. | 342/457 |
| 4,881,082 | 11/1989 | Graziano | 379/60 |
| 5,095,531 | 3/1992 | Ito | 455/33.2 |
| 5,161,248 | 11/1992 | Bertiger et al. | 379/60 |
| 5,170,485 | 12/1992 | Levine et al. | 455/33.4 |
| 5,235,633 | 8/1993 | Dennison et al. | 379/60 |
| 5,239,667 | 8/1993 | Kanai | 379/60 |

FOREIGN PATENT DOCUMENTS

| | | | |
|---|---|---|---|
| 0245639 | 3/1987 | Japan . | |
| 0073925 | 3/1989 | Japan | 379/60 |

OTHER PUBLICATIONS

IEEE Communications magazine, "The Cellular Environment of Lightweight Handheld Portables", 1989, pp. 20–29.

Fluhr et al, The Bell System Technical Journal, "Control Architecture", vol. 58, No. 1, Jan. 1979, pp. 43–69.

Chadha et al, The Bell System Technical Journal, "Mobile Telephone Switching Office", vol. 58, No. 1, Jan. 1979, pp. 71–95.

*Primary Examiner*—Curtis Kuntz
*Assistant Examiner*—Dwayne D. Bost
*Attorney, Agent, or Firm*—Fay, Sharpe, Beall, Fagan, Minnich & McKee

[57] ABSTRACT

With respect to a mobile communication system, intelligence learns a cell boundary where the field strength of adjacent base stations becomes equal, by measuring field strength of communications, and from this data determined and stored over a period of time, the intelligence calculates the position and velocity vector of each mobile unit, from which a priority for hand-off can be determined. Hysteresis of the hand-off is determined with respect to hand-off boundaries located a fixed distance from the measured cell boundary, with hand-off preferably being soft hand-off within the narrow hand-off boundaries. Priority is particularly determined using fuzzy logic and calculation of the time estimated for the mobile unit to reach the cell boundary. Battery consumption of the mobile units is improved by prolonging the interval of checking the position of mobile units, when the mobile units are moving slowly or not moving at all. The determination of the cell boundary is updated continuously, to compensate for environment changes affecting field strength.

24 Claims, 8 Drawing Sheets

AVERAGE CELL PASSAGE TIME

| | CELL RADIUS | AVERAGE PASSAGE VELOCITY | PASSAGE TIME (MIN) |
|---|---|---|---|
| INDOOR RADIO TELEPHONE | 30~100m | 4km/H | 0.5~1.5 |
| MICROCELLULAR | 1~3 km | 50km/H | 1~3.5 |
| AUTOMOBILE TELEPHONE | 3~10km | 50km/H | 4~12 |

MOBILE COMMUNICATION SWITCHING ACROSS CELL BOUNDARIES

BACKGROUND OF THE INVENTION

The present invention relates to a mobile communication system, and is particularly adapted to indoor radio telephones in building premises connected to exchanges and in urban areas, and more particularly to mobile switching without interrupting the call even though a service area of a base station has changed during that call.

Conventional similar apparatus of this type have been used in urban mobile telephone systems, as discussed in "Bell System Technical Journal", Vol. 58, No 1, (1979), pp. 43–95. When it is necessary to switch a mobile channel as a mobile unit is moved from the service area of one base station through which a call is being made to the service area of another adjacent base station, a central intelligence decides not only the necessity but also the adjacent base station and thereafter instructs the adjacent base station to prepare a vacant radio channel (hereinafter shortened to CH). Further, the central intelligence alters the registration of the mobile unit and simultaneously switches the CH over to the adjacent base station.

SUMMARY OF THE INVENTION

It is an object of the present invention to analyze previous mobile systems to identify and understand their problems, and further to overcome such problems.

The operating procedure of the above-described prior art will now be analyzed in detail with reference to FIGS. 4A, 4B, 4C. As the receiving field strength of a mobile unit 4 that is communicating with a current base station 1 becomes lower than $E_0$, the mobile unit 4 requests the center intelligence to change the current base station 1 via an upward-bound data circuit. On receiving this request, the center intelligence determines an adjacent target base station 2 in consideration of the receiving field strength $E_1(r)$ of base station 1 and the receiving field strength $E_2(r)$, $E_3(r)$ of adjacent base stations 2 and 3. When the receiving field strength $E_1(r)$ of the mobile unit becomes lower than a set alert value $E_t$, the center intelligence decides to change a state function $\Gamma(r)$ of FIG. 4C from $\Gamma 1$ to $\Gamma 2$ at $r_t$ and also switches the radio CH from the base station 1 to base station 2.

When the mobile unit 4 operating with the radio channel CH for base station 2 moves from the service area of the base station 2 to the service area of the base station 1, the center intelligence likewise decides to change the state function $\Gamma(r)$ from $\Gamma 2$ to $\Gamma 1$ at $r_s$. The spacing of $r_s$ and $r_t$ provide a large hysteresis response in the vicinity of a straight line (y axis) extending between base stations 1 and 2, but the hysteresis reduces as you move along line $r_c$ in either direction (parallel to the X axis) perpendicularly from the line between base stations 1 and 2. The line $r_c$ is a theoretical or ideal cell boundary line of equal field strengths between the base stations 1 and 2, $r_t$ is a theoretical ideal loci of a field strength $E_t$ with respect to base station 1, whereas $r_s$ is a theoretical ideal loci of field strength $E_t$ from base station 2. $r_1$ is the distance of the mobile unit 4 from the base station 1 having the coordinates 0,0 and $r_2$ is the distance of the mobile unit 4 from the base station 2 having the coordinates 0, b with the coordinates being measured in the X and Y directions. The base stations 1 and 2 are located from each other by a distance b. $E_c$ is the receiving field strength of a mobile unit traveling along the boundary RC.

FIG. 4b shows the plots of the field $E(r)$ strength of base station 2 and base station 3, $E_2(r)$ and $E_3(r)$ with respect to the coordinates of base station 1, whereas the curve $E_1(r)$ shows the plot of the field strength of base station 1 relative to its coordinates, with r being a radial direction from the base station 1. Where these field strengths are equal, along $r_c$, the field strength is $E_c$.

While FIG. 4 disclosed ideal situations, FIG. 3 shows actual measured values of field strength. FIG. 3A shows a synchronized diagram of field strength and switching functions for one situation, and FIG. 3B shows a corresponding synchronized diagram for an extraordinary situation where the hysteresis response is broken by fading. The hysteresis response is indicated with respect to the field strength of the base stations. FIG. 3 will be discussed further at a later time.

A first problem occurs when the prior art is applied to indoor radio telephones in building premises and applied to urban areas. The problem involves the frequency of hand-off per mobile unit, which frequency tends to increase as small transmission power narrows a service area. FIG. 5A, with reference to a plurality of service areas as shown in FIG. 5B, shows cell radius (representing a service area) and the passage time required (inversely proportional to hand-off frequency) for a mobile unit to pass across the cell radius at average passage velocities of 4 km per hour, 50 km per hour and 50 km per hour for indoor radio telephones, microcellular radio communication, and automobile telephones. Therefore, the frequency of hand-off per mobile unit regarding the indoor radio telephone is about ten times greater than the frequency of hand-off for the microcellular communication system and the automobile telephone system. FIG. 5 also shows that, even compared to an automobile telephone system, that a microcellular system with a small cell radius also poses the above problem relating to the frequency of hand-off increasing with the narrowing of the surface areas. FIG. 5A was prepared with respect to the model shown in FIG. 5B, wherein a mobile unit 4 travels along a path 22 to pass between the service areas (within the cell boundaries between adjacent base station units) of base station units 1, 2, 1A, 2A and 3. The length 24 of the cell boundary becomes quite short in such systems and is the cell radius set forth above in FIG. 5A, or the cell radius could be the radius 23 from a base station to the nearest cell boundary, either of which is an indication of the narrowness of the surface area.

A second problem is that a cellular configuration, particularly with respect to indoor radio telephones, becomes complicated and variable, depending upon the arrangement of obstructions, particularly office furniture, petitions and the like for the indoor radio telephone communication system. Consequently, the number of exceptional or extraordinary processes, to be described with respect to FIG. 3B, for providing the hysteresis response, described with respect to FIG. 4, increases as the intersection of $E(r)$ and $E_t$ varies throughout the premises. Moreover, a complicated maintenance work of the communication system for re-adjusting parameters is required to deal with changes in the environment of the base stations. For example the changing of partitions and office furniture within an indoor radio telephone communication system may require substantial changing of the hand-off parameters for a prior art type indoor radio telephone communication system.

It is an object of the present invention to overcome the above-mentioned first and second problems occurring during switching of a base station through which a telephone call is being made.

In this specification, a telephone call or radio communication are merely examples of the types of communications involved, and it is understood that the communication between a mobile unit and a base station may take various forms.

BRIEF DESCRIPTION OF THE DRAWINGS

Further objects, features and advantages of the present invention will become more clear from the following detailed description of a preferred embodiment, shown in the drawing, wherein.

DETAILED DESCRIPTION

In order to accomplish the above objects, the present invention includes many features, some of which are:

(a) A central intelligence learns each equal-strength cell boundary of adjacent base station units once or at intervals, with each such boundary physically being $r_c$ and stored as a determinate cell boundary $R_c$ by the system. The cell boundary, as shown in FIG. 3, for example, is $r_c$ for the actual system, and the cell boundary as determined by the intelligence of a mobile unit, or the intelligence of a base station, or the intelligence of a central intelligence is determined and stored as $R_c$ and the determined cell boundary $R_c$ represents with varying degrees of accuracy the actual or physical cell boundary $r_c$ of equal field strength between two adjacent base station units.

(b) A plurality of base station units each measure the field strength $E(r)$ of a mobile unit n to reckon its position (x, y), calculate distances r from the mobile unit n to the cell boundary $R_c$ to secure the hysteresis response no matter how much fading there may be.

(c) The time required for a mobile unit 4 to reach the cell boundary $R_c$ is calculated to decide the degree of urgency and the priority order of switching the base stations in accordance with this degree of urgency, whereby the amount of processing is reduced as compared to the prior art.

Furthermore, when the mobile unit is moved after the base station units are initially set up, that is fixed in location, and after the cell boundary $R_c$ is learned by the system, the center intelligence or intelligence of the base stations or intelligence of the mobile units (hereinafter generically "intelligence") performs on-line learning of the cell boundary $R_c$ using logic, preferably fuzzy logic, to update the stored cell boundary $R_c$, which fuzzy logic simplifies the cell boundary learning software. Therefore, maintenance work to accommodate for changes in the environment of the base station units is eliminated or at least simplified and the function of the previous maintenance work of the prior art is performed by the updating of the cell boundary $R_c$ by the cell boundary learning process of the intelligence (centralized or distributed), particularly using fuzzy logic.

Furthermore, with the learning of the cell boundary Rc, so-called soft hand-off can be reduced as compared to the prior art. Soft-hand-off is where a mobile unit operating within the service area of a base station unit (e.g. 1) is slowly switched over to the service area of another base station unit (e.g. 2) or both base station units are used simultaneously during the soft hand-off over an extended period of time, which soft hand-off can be implemented by fuzzy logic that simplifies the software and makes it unnecessary to compute for exceptional or extraordinary processing to accommodate problems in the hysteresis, as set forth with respect to FIG. 3B, which occurs with a complicated cell configuration.

Figure 3A:
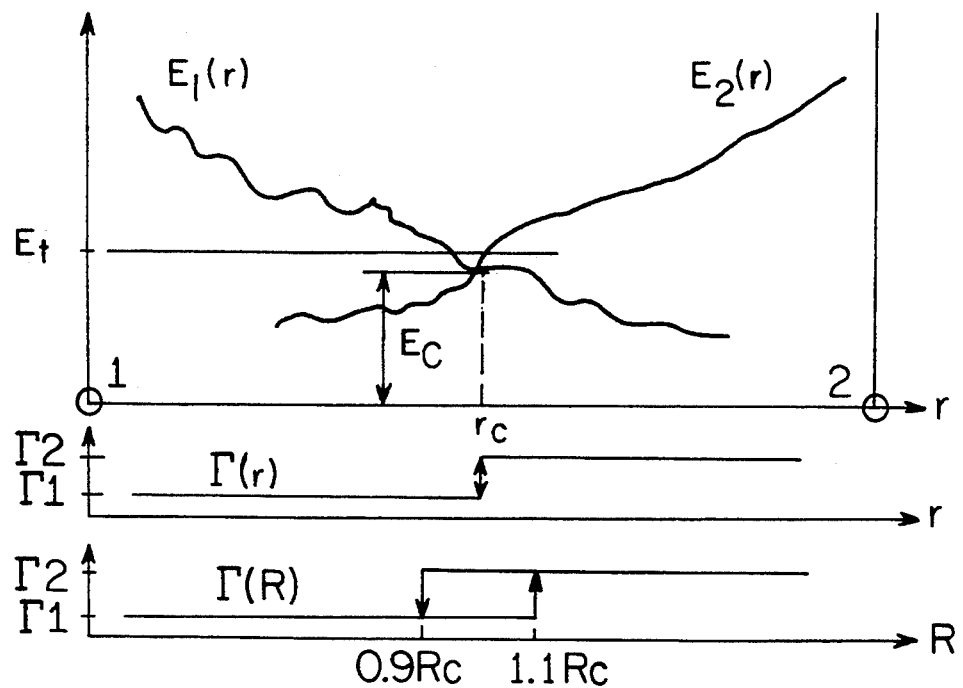
FIG. 3A is a synchronized diagram of switching functions based upon switching at a cell boundary or switching at positions removed from the cell boundary as they relate to base station unit field strength, plotted with respect to the radial distance from the coordinates (0,0) of base station unit 1.
Figure 3B:
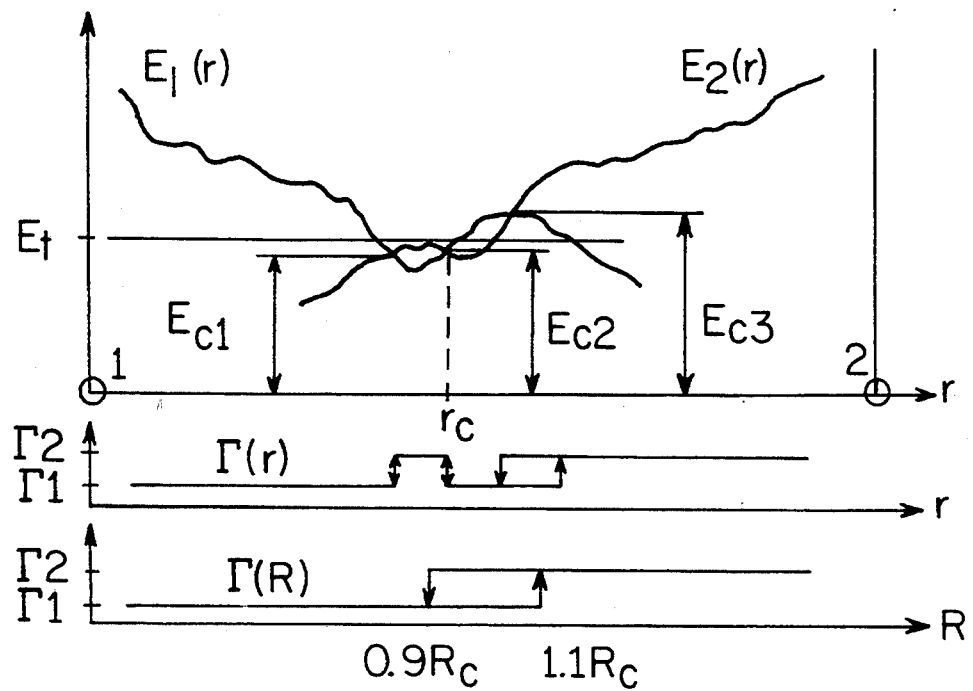
FIG. 3B is a synchronized diagram similar to that of FIG. 3A, but showing exceptional or extraordinary processing as a result of excessive fading.
Figure 4A:
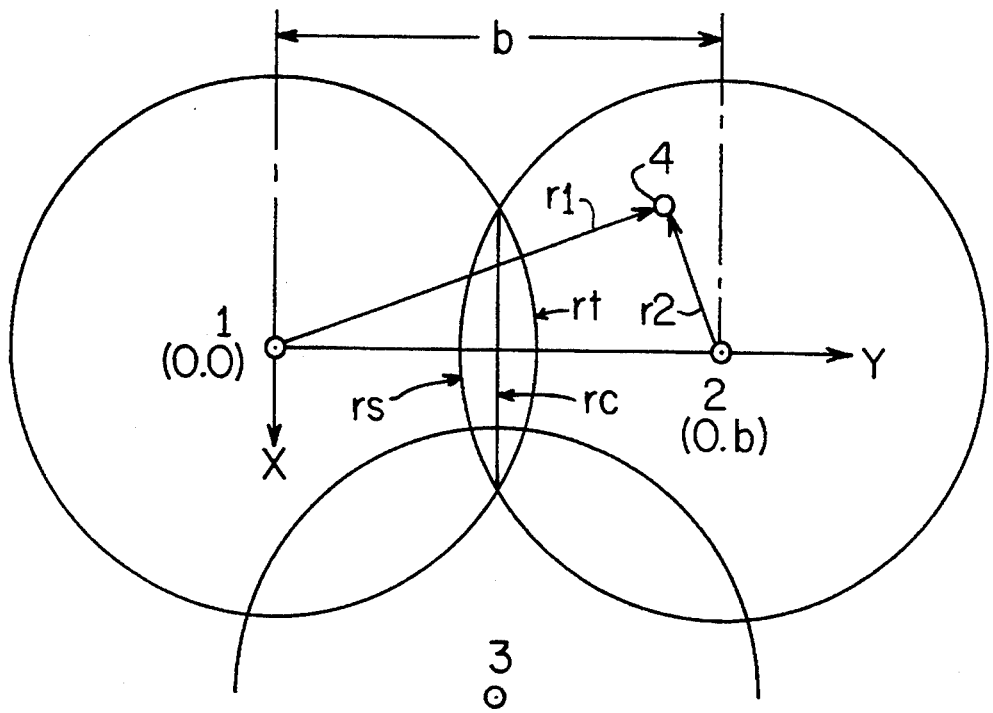
FIG. 4A is a simplified diagram similar to that of FIG. 2.
Figure 4B:
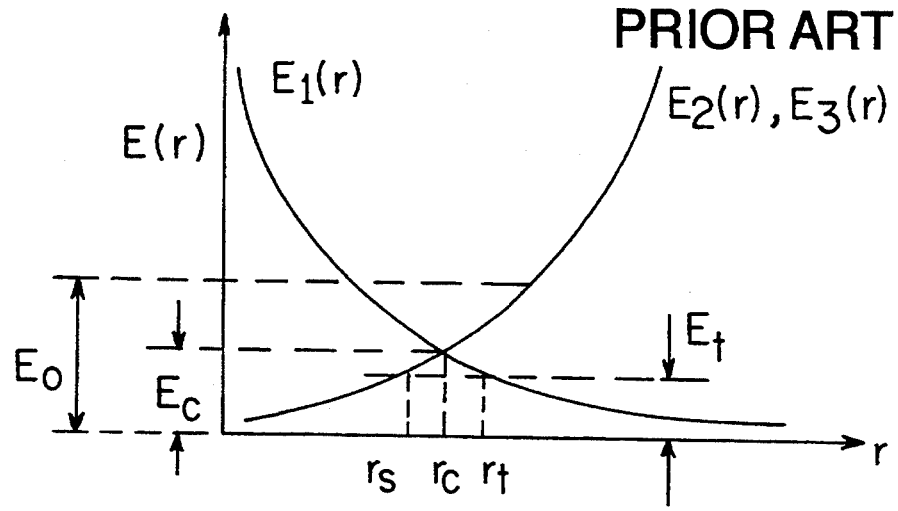
FIG. 4B and 4C are simplified diagrams based upon ideal or theoretical configurations and otherwise similar to FIG. 3A.
Figure 4C:
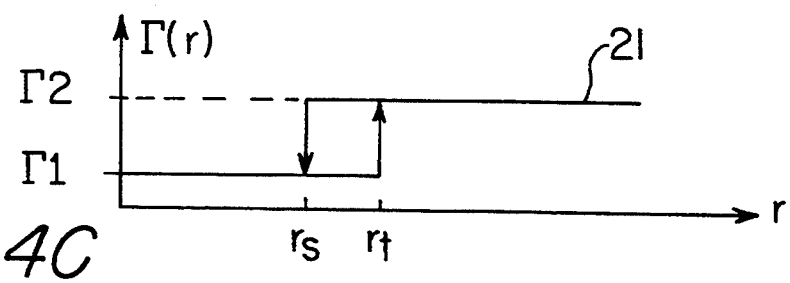
Figures 5A, 5B:
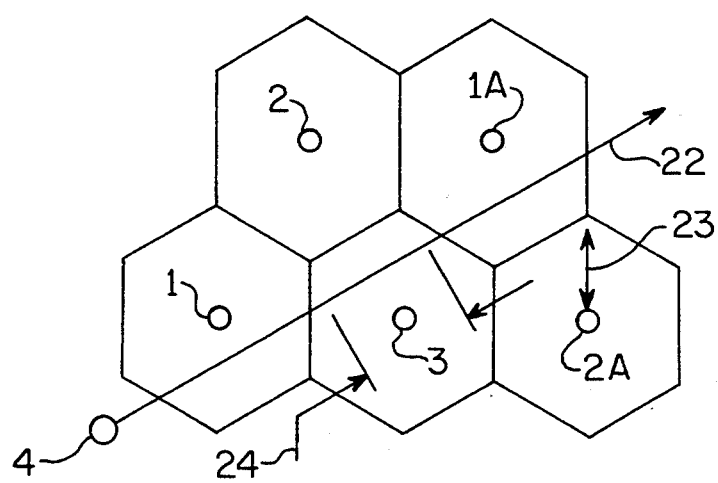
FIG. 5A is a table for explaining hand-off frequency with respect to various systems, with reference to cell boundary configurations of FIG. 5B.

More specifically, if soft hand-off is performed within the area bounded by the two radii $r_l$ and rs in FIG. 4, where they overlap, a great amount of soft hand-off processing is required because such area is quite large (the area including the cell boundary $r_c$ in FIG. 4A). Even at this, the actual cell boundary $r_c$ would not be a straight line as indicated in FIG. 4A and may in fact wander out of such soft hand-off region or area so that still an extraordinary or exceptional hysteresis situation would be involved such as shown in FIG. 3B. In FIG. 3B, it is seen that in addition to the cell boundary $r_c$ having equal field strength $E_{c2}$, there are two additional points of equal field strength, $E_{c1}$ and $E_{c3}$, which complicates the hand-off and makes the hand-off unstable. According to one aspect of the present invention, the area of soft hand-off is calculated to be a fixed amount to each side of the calculated cell boundary $R_c$, for example 0.9 $R_c$ and 1.1 $R_c$ shown in FIGS. 3A, 3B, to provide the function $\Gamma(R)$ to determine the hand-off, which will provide for hysteresis and elimination of the extraordinary hand-off problem. Furthermore, by using a measured cell boundary $R_c$ and defining the area for soft hand-off as a small amount on each side of the measured cell boundary $R_c$, the area for soft hand-off can be greatly reduced as compared to the area shown in FIG. 4A. For an indoor telephone communication system, the area for soft hand-off could be defined as approximately 3 feet on each side of the cell boundary $R_c$ for the entire length of the cell boundary $R_c$.

Figure 2:
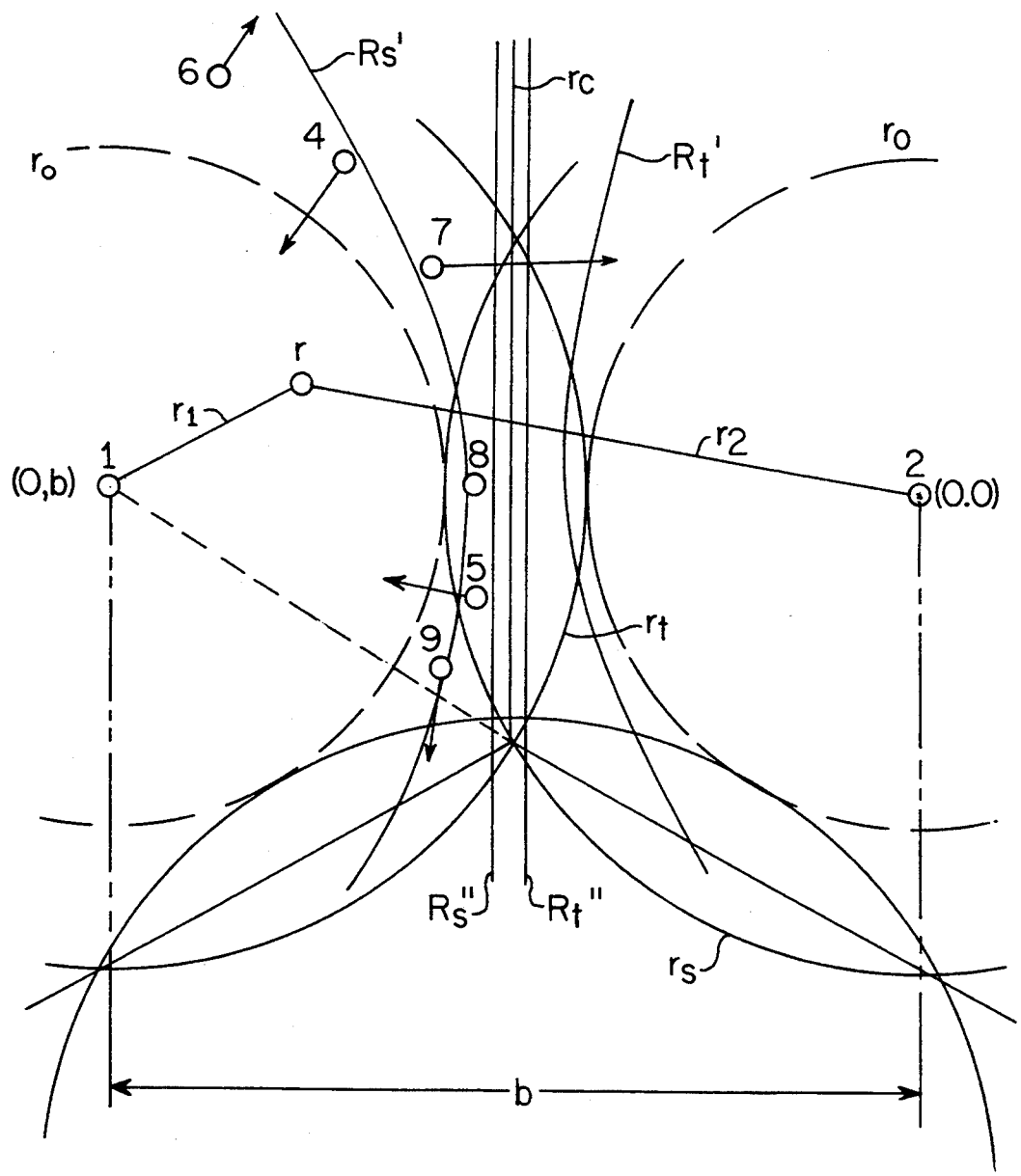
FIG. 2 is a diagram showing various relationships between two base station units and a plurality of mobile units, useful in explaining the features of the present invention.

With respect to the ideal or theoretical field strength locii as shown in FIG. 2, a hand-off method according to the present invention will now be described.

According to the present invention, a mobile unit that urgently needs hand-off from one base station unit to another base station unit is distinguished from the other mobile units with respect to a stored cell boundary $R_c$, particularly a learned cell boundary and more particularly with respect to a learned cell boundary that is repeatedly updated during operation of the system. The position of each of the mobile units 4, 5, 6, 7, 8 and 9 is determined repeatedly and by comparing positional data of each mobile unit over a period of time. The velocity of each mobile unit can be detected. By using this information of several base units with respect to a mobile unit, a velocity vector can be determined. The velocity vector represents not only a value of velocity but a direction of velocity.

In general, the field strength data of transmission between any mobile unit m and at least two base station units 1, 2 can be used to determine the distance $r_1$ from the mobile unit m to the base station unit 1 and the distance $r_2$ from the mobile unit m to the base station unit 2. From these distances $r_1$, $r_2$ the position (x, y) of the mobile unit m can be determined. As mentioned, the change in position with respect to time will determine the velocity vector (shown as an arrow for some of the mobile units, where the arrow direction indicates direction of movement and the arrow length represents velocity—in this regard, FIG. 2 may represent a display). The velocity vector and position of each of the mobile units 4, 5, 6, 7, 8 and 9 is indicated on the diagram. The intelligence, which may be a center intelligence, or distributed intelligence within the base station units (one, some or all) or mobile units, discriminates the mobile unit 7 as a mobile unit most urgently needing hand-off (its vector indicates a high velocity and a direction towards the cell boundary rc from a position close to the cell boundary $r_c$) and further determines that the mobile unit 8 is second in its urgency of needing hand-off. In this manner, the amount of hand-off processing is reduced. Furthermore, when the vector of a mobile unit, such as mobile unit 4 or 5, indicates that it is heading away from the closest cell boundary $r_c$ or when its vector indicates that it is moving slowly or stopped, its positional data may be sampled less frequently to further reduce processing time or processing amount. That is, the intelligence periodically or repeatedly measures the field strength of the communication of the mobile units 4–9 with the base stations 1, 2, 3 and thereby determines both the positions and velocity vectors of the mobile units 4–9. By calculating the time required for the mobile units 4–9 to each reach the equi-strength boundary rc or a value correlated thereto, the intelligence can thereby select the mobile units 7 and 8 as most urgently requiring hand-off and thereby determine the priority order of hand-off among all of the mobile units to reduce the amount of processing by a large margin as compared to the prior art.

Moreover, the intelligence measures the field strength of communication between the base stations 1, 2, 3 and the mobile units 4–9 at regular or irregular intervals and reports the results to the controlling intelligence, such as the center intelligence 15, whereas the intelligence then calculates the positions and velocity vectors of the mobile units and compares the results of the calculations with the equi-strength boundary $R_c$ that is stored (the boundary $R_c$ was learned and updated) to decide the degree of urgency in switching base stations.

As described before, the hysteresis in switching can be determined by the locii $r_t$ and $r_s$, but as seen the hysteresis then becomes quite small for a mobile unit traveling near the intersection of $r_s$ and $r_t$, such as the mobile unit 7 as compared to the mobile unit 8 that travels where the loci $r_s$ and $r_t$ are further apart. According to another feature of the present invention, the loci for switching may in fact be a fixed distance from the cell boundary $r_c$, such as 0.9 and 1.1 times $r_c$ or $R_c$ and as previously described with respect to FIG. 3B and 3A. Furthermore, instead of the described switching locii $R_s'$ and $R_t'$ the locii switching points $R_s''$ and $R_t''$ may be defined as a fixed amount from the cell boundary $r_c$.

Figure 6:
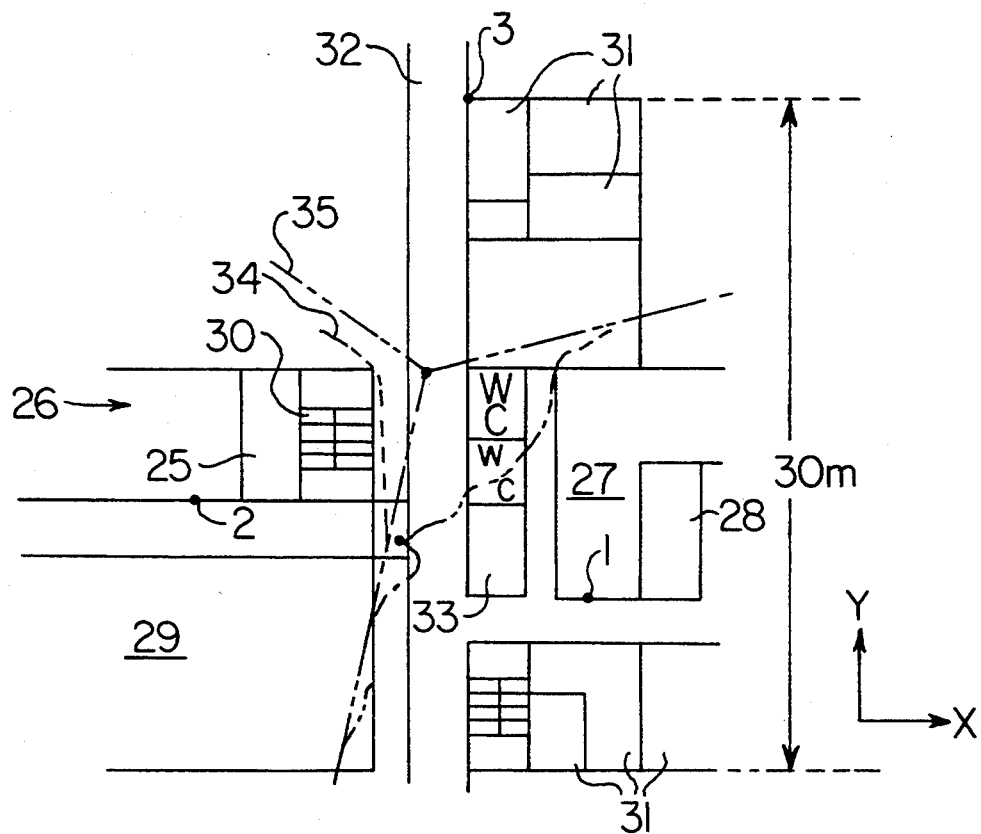
FIG. 6 shows the physical layout of an indoor telephone communication system with respect to cell boundaries, ideal and measured.

As shown in FIG. 6, the actual measured cell boundaries 34 between three adjacent base stations 1, 2 and 3 may be extremely complicated for the indoor radio telephone communication system in a building premise, particularly as compared to the predicted or ideal cell boundaries 35 for which radio wave disorder is assumed non-existent. In learning the equi-strength cell boundaries $R_c$, for example the cell boundary 34 in FIG. 6, fuzzy logic may be used for on-line learning in the direction of the sharpest descent with the actual measurements as instructor data to take a shortcut to quick learning so that learning software is simple.

As shown in FIG. 6, office furniture, partitions and the like may greatly affect the actual cell boundaries 34, and such items can be moved to change the actual cell boundaries. These items that affect the cell boundaries 34 include the walls, floor and-ceiling that form a machinery warehouse 25, a printing room 26, a computer room 27, a laboratory 28, an office 29, a stairway 30, research rooms 31, hallways 32, workshop 33, as well as various office furniture and movable partitions (not shown), all of which will account for the difference in configuration between the measured cell boundary $R_c$ 34 and the ideal or predicted cell boundary $r_c$ 35.

Figure 7:
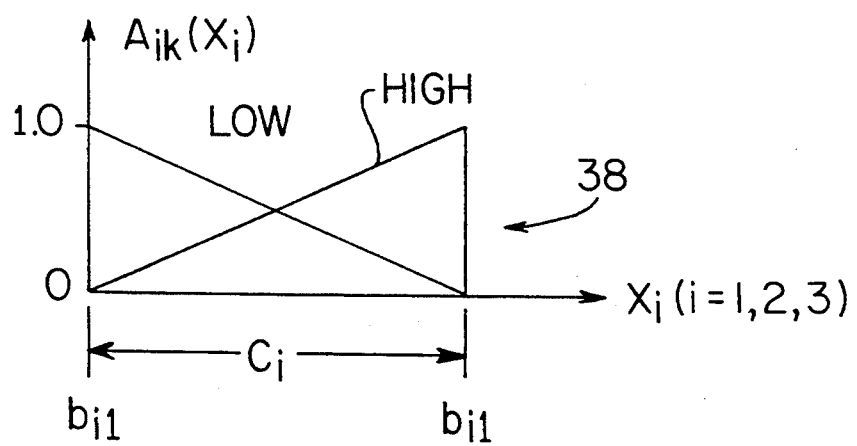
FIG. 7 shows a relationship useful in explaining fuzzy logic as used according to the present invention.

Using the foregoing information and with reference to FIGS. 7-9, a preferred embodiment of performing the various calculations mentioned above will now be described. In an X, Y coordinate system shown, an ideal model of a cell boundary is approximated by a polynomial $$y = a_0 - a_1 x + a_2 x^2 + a_3 x^3 + \tag{1}$$

and a fuzzy output is represented by $$ym = \Sigma \mu_k \cdot W_k(t) \tag{2}$$

where $$W_k(t+1) = \tau \cdot \mu_k \cdot \delta(t) \tag{3}$$

$$\delta(t) = y - y_m$$

$\mu_k$ ... antececent truth value $\tau$ ... learning coefficient t ... time and expressed by a fuzzy output $y_m$ and a consequent truth value $W_k$. By making actually measured values at 10-20 points of the ideal model y instructor data and sequentially converging the initial value in the direction of the sharpest descent from t to t+1, learning is pursued.

As the cell boundary $R_c$ is thus learned, the soft hand-off, where base station 1 is slowly switched over to a base station 2 and where both the base stations are simultaneously used in the vicinity of the boundary, is readily implemented by fuzzy logic. Hysteresis response shown in FIG. 2 is thereby held in a predetermined value to prevent frequent switching during the movement all along or close to the cell boundary $R_c$.

If fuzzy logic rules in the form of if-then statements are used to decide the priority order of urgency of switching, as described above with respect to FIG. 2, the operational software may be simplified as language expressions are usable when errors in position measurement due to fading are absorbed.

In this case of fuzzy logic, $\mu_k$ is $$\mu_k = A_{1k}(x_1) * A_{2k}(x_2) * A_{3k}(x_3) \tag{4}$$

the product of membership functions $A_{jk}(X_i)$ in general and in the specific example where j=1,2,3 and i=1,2,3, the product is $A_{1k}(x_1)$, $A_{2k}(x_2)$, $A_{3k}(x_3)$ with three variables $x_1$, $x_2$, $x_3$. The membership function $A_{jk}(X_i)$ may be a simple triangle membership function 38 as shown in FIG. 7 and at k=1, for instance, $$\mu_1 = (1 - |b_{10} - x_1|/c_1)(1 - |b_{20} - x_2|/c_2)(1 - |b_{30} - x_3|/c_3)$$

Moreover, k designates a rule number in the fuzzy logic and at k=1, for instance, if $x_1$ is low and $x_2$ is low and $x_3$ is low then y is $w_1 = y(x_1) = y(x_2) = y(x_3)$.

At k=2, if $x_1$ is high and $x_2$ is high and $x_3$ is high then y is $w_2 = y(x_1) = y(x_2) = y(x_3)$, when a membership function conforming to the logic rule is used for Eq. (5) of $\mu_k$.

Figure 8A:
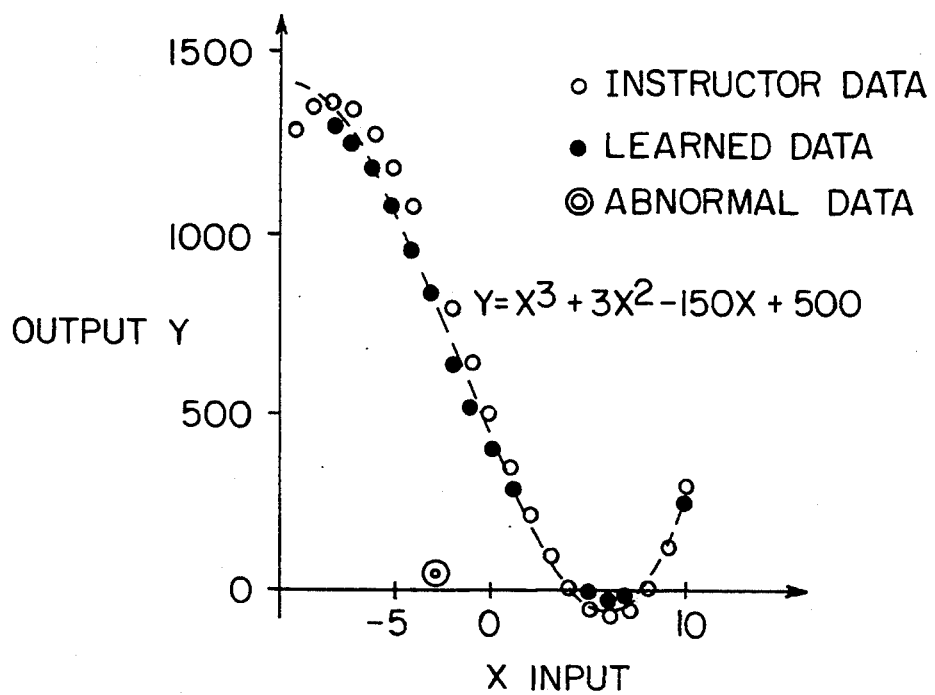
FIGS. 8A and 8B are diagrams useful for explaining fuzzy logic in determining cell boundaries.
Figure 8B:
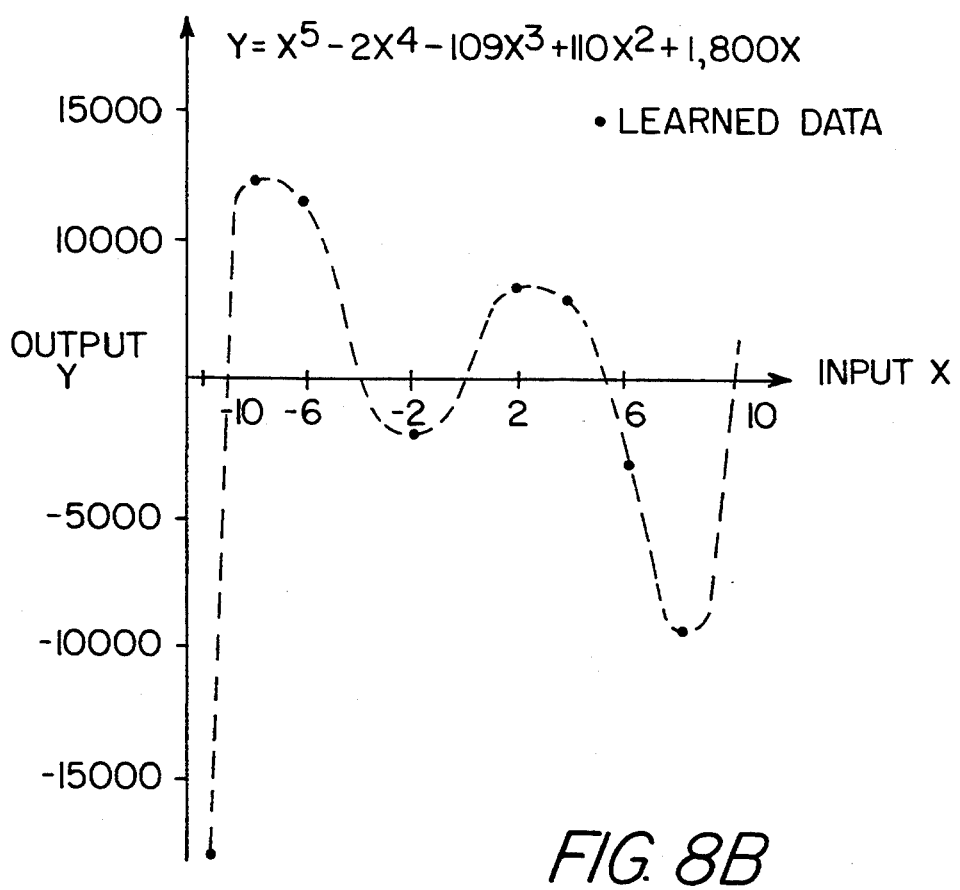

According to computer simulation, the instructor data resulting from dividing into 20 the s-shaped part of a tertiary function $y = x^3 + 3x^2 - 150x + 500$ as shown in FIG. 8A was successfully used for converging the curve up to a relative error of $10^{-4}$ when learning is pursued 100 times at t=1.0. In the case of a quinary function $y = x^5 - 2x^4 - 109x^3 + 110x^2 + 1800x$, in FIG. 8B, such convergence was established with a relative error of $10^{-3}$ when learning is pursued 100 times at t=1.0. The advantage of the fuzzy logic is that the error can be dispersed over the whole curve when irregular data is contained in the instructor data as shown in FIG. 8(A) and this advantage is not gained in a deterministic theoretic method such as a method of least squares.

When the cell boundary $R_c$ is actually learned, a statistic mean value $E_1(\dot{r})$ of the field strength of the base station 1 (with an antenna at $\dot{r}=0$) received by a mobile unit at a position vector $\dot{r}$ is known to become $$E_1(\dot{r}) \propto \sqrt{(P_1/r^{\alpha_1})} \tag{6}$$

where
$P_1$ ... transmission power of the base station 1
$\alpha_1$ ... statistic attenuating index of radio wave from the base station 1.
. $\alpha_1 = 3.5$ in an urban area of r=1-20 km with UHF band propagation;
. $\alpha_1 = 4-5$ in building premises.
r ... vector length of vector $\dot{r}$ Consequently, $$\dot{R}_1(\dot{r}) = \dot{A}(\dot{r})/(E_1(\dot{r}))^{2/\alpha_1} \tag{7}$$

the concept $\dot{R}_1(\dot{r})$ known as a field-strength-distance vector (hereinafter called field-strength-distance) defined above may be used to make $\dot{A}(\dot{r})$ a gently-fluctuating vector coefficient within a range where the field strength $E_1(\dot{r})$ is regarding as being reduced monotonously.

The field-strength-distance $\dot{R}_1(\dot{r})$ is a mapped space from the physical position vector i$\dot{r}$ and even when there exists radio wave disorder in the space, the cell radii of the respective cells are approximately equalized.

Provided the radio wave disorder is homogeneous while fading is ignorable, the cell boundary may approximated to linearity. Even if the radio wave disorder is not homogeneous, the boundary 34 fluctuates more gently than what is shown in FIG. 6 and learning is facilitated.

The actual or ideal mapped space (lowercase) is learned and calculated (uppercase) in such a way as to replace the lowercase letters of FIGS. 2 to 4 with the uppercase letters (r→R, $r_c$→$R_c$, etc.). The positional coordinates (X, Y) of the mobile unit in this space are readily obtainable as follows. In FIG. 2, coordinates (X, Y) of the mobile units positioned at $R_1$, $R_2$ from the base station 1 with coordinates (0, 0) and the base station 2 with coordinates (0, b) that are separated a physical distance b (field-strength-distance B) are simply obtainable from $$Y = B^2 + R^2{}_1 - R^2{}_2/2B$$

$$X = \pm \sqrt{(R^2{}_1 - Y^2)} \tag{8}$$

In this case, the cell boundary $R_c$ becomes approximately $Y \approx B/2$, indicating the position where the field strength of both base stations is equalized and maximized, the cell boundary Rc being determined by an actual measured value. The double sign $\pm$ of X can easily be decided by measuring field-strength-distance $R_3$ with a base station 3. At the time of hand-off of the base stations 1, 2, however, a distance (Y component) with respect to the boundary $R_c$ is important and the double sign is also rendered important when the hand-off station opposite to the base station 3 is changed. It is thus not always necessary for the boundary to be strictly learned but important to make the intelligence store the boundary equivalently with certainty by tangentially approximating the neighborhood thereof.

The equation of the boundary resulting from learning Eg. (1) becomes $$Y = A_0 + A_1 x + A_2 x^2 + A_3 x^3 + \tag{9}$$

and $A_0 \approx B/2$. The distance H between the mobile unit and the boundary rc is easily obtained by linearly approximating Eq. (9) as follows:

$$H = |Y - A_0 - A_1 X| \sqrt{(A^2{}_1 + 1)} \approx |Y - B/2| \tag{10}$$

A decision on whether the boundary has been passed depends on the size of $R_1$ and $R_2$.

The rate of travel (velocity) of the mobile unit is decided by periodically measuring H to examine the size of H as a variation of H. A Y-axis component $V_y$ of the rate of travel of the mobile unit is important and average predicting time T for the mobile unit to reach the boundary is $$T = H/V_y - H \cdot t/H \qquad (11)$$

In this case, t is a period for measuring H and it is about $t = 1$ second in building premises. To determine priority order for the mobile unit, $$T' = T/t = H/H \qquad (12)$$

is effective and if $T' < 1$, the mobile unit may possibly pass through the boundary rc faster than what is stipulated by time t for measuring H subsequently, so that it is decided that the mobile unit is to be handed off by highest priority.

If $T' < 0$, the mobile unit may be left taking its own course as it moves in the negative direction of the Y-axis. If $T' > 1$, the mobile unit is judged to be stationary. Accordingly, it is possible to reduce the hand-off amount processing with the omission of measurement of H by $T'/2$ times in consideration of allowance for the positional measurement of the mobile unit and operations on $T'$. The actual field-strength-distance is accompanied with an error because of the fading phenomenon. Therefore, the average value of several operations should be employed. For more drastic fading, prior learning of what is between the moving mean values of the physical distance and the field-strength-distance may solve such fading problem.

Returning to FIG. 3, the present invention solves problems arising from the complication of the actual or ideal cell boundary $r_c$. Even though the arrangement of the antenna of each base station unit is carefully chosen in view of the environment of the base station, the field strength $E_c$ of a boundary $r_c$ becomes lower than a set alert value of field strength $E_t$, thus producing an area where hand-off is unstable as shown in FIG. 3A by arrows at both ends of the transfer line between state function $\Gamma(r)$ between $\Gamma 1$ and $\Gamma 2$ at rc at the field strength $E_c$. A radio telephone system communication may employ the field strength measured by the base station 3 to designate the area to set $E_t$ lower than $E_c$ to then obtain hysteresis with a field strength configuration such as that of FIG. 3A. If $E_t$ is lowered outside the area of instability so that the hysteresis response is designated to a wide range, the exceptional or extraordinary process as explained above can be dispensed with, for example, by setting the hysteresis state changes at 0.9 $R_c$ and 1.1 $R_c$ for the state function $\Gamma(R)$, according to the present invention, and hysteresis can always be obtained for the hand-off. However, loss probability increased when a frequency channel reutilization factor lowers with a number of calling mobile units equalizing the number of called mobile units.

When the field strength $E_1(r)$ is considered not to be a monotonous decrease, as the peripheral environment of the base station complicates, as shown in FIG. 3(B), the state function $\Gamma(r)$ has both an unstable point and hysteresis response. The equal field strength distance R becomes a three-value function $E_{c1}$, $E_{c2}$ and $E_{c3}$ of the physical distance r at this time, and the velocity of equation 11 has an inverted polarity. When the distance with the polarity inverted is wide as shown in FIG. 3(B), the polarity may not be dealt with even though the mean value is used several times. As a result, the use of an exceptional process by reference to the base station 3 in place of the base station 2 is necessitated. The intelligence of the present invention, preferably the center intelligence, learns a representative cell boundary Rc in such a case that the cell configuration is complicated according to the present invention and provides the starting point of the hysteresis response as described above, that is as a fixed distance to either side of the cell boundary Rc to stabilize the hand-off process.

In other words, 0.9 $R_c$ and 1.1 $R_c$ preceding and following the boundary $R_c$, respectively, are set as shown in FIG. 3B, for instance, to assure the hysteresis response even in a complicated configuration of the cell boundary $R_c$. When there are more than one point of equal field strength, as shown in FIG. 3B, namely for the field strengths $E_{c1}$, $E_{c2}$, $E_{c3}$, the cell boundary $R_c$ corresponding to the central one of the equal field strengths, that is corresponding to $E_{c2}$, is set as the cell boundary $R_c$ and logical operations for holding the hysteresis response are performed using $E_{c2}$ as $R_c$, that is the transition points for the state function $\Gamma(R)$ are set at 0.9 $R_c$ and 1.1 $R_c$.

By providing a measured cell boundary $R_c$ and calculating the hand-off boundaries, particularly as 0.9 $R_c$ and 1.1 $R_c$, the hand-off may be stabilized, and such is particularly useful when fuzzy logic is used, particularly using the fact that the cell boundary $R_c$ is fuzzy. A description will now be given of use of a soft hand-off with fuzzy logic. More specifically, the base stations 1, 2 are simultaneously used within the cell hand-off boundaries 0.9 $R_c$ and 1.1 $R_c$ for communication with any mobile unit within such boundaries to assure the hysteresis response as shown in FIGS. 3A and 3B for state function $\Gamma(R)$ and avoid the unstable response of state function $\Gamma(r)$ of FIGS. 3A, 3B while employing a simplified software. In order words, the membership function incorporating the cell boundary $R_c$ that is learned is used and the following two cases of fuzzy logic rules are applied to the field-strength-distances of FIG. 2 that are measured by the intelligence associated with the mobile units and the base station units.

$k=1$ if $R_1$ is near and $R_3$ is far then $\Gamma 1$ is 1 and $\Gamma 2$ is 0 (13)

$k=2$ if $R_1$ is far and $R_2$ is near then $\Gamma 1$ is 0 and $\Gamma 2$ is 1

Figure 9A:
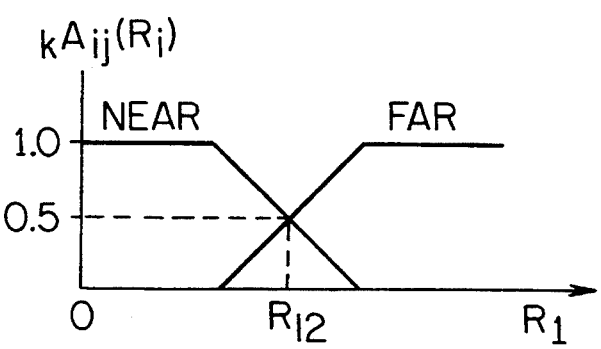
FIGS. 9A, 9B, and 9C are diagrams useful in explaining fuzzy logic as it applies to the hand-off procedure.
Figure 9B:
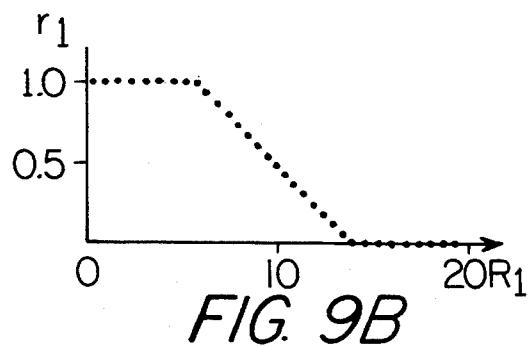
Figure 9C:
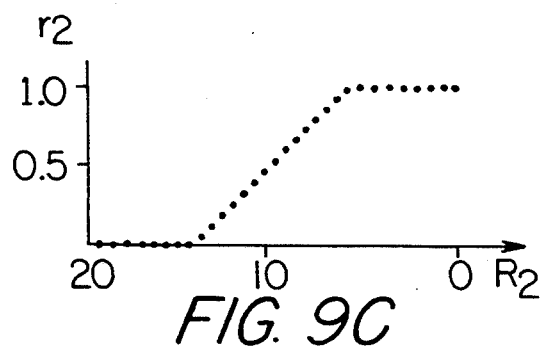

The ratios $\Gamma 1$, $\Gamma 2$ in this case indicate a composite ratio of audio signals of the respective base stations 1, 2. e1 and e2 represent demodulated audio signals from base 1 and base 2, respectively, that are obtained by demodulating E1 and E2. The definition of a membership function $_kA_{ij}(R_i)$ as shown in FIG. 9A is used for language variables "near" and "far". Further, AND and OR of the antecedent truth value and the consequent truth value of the above rule are used to obtain $\Gamma 1$, $\Gamma 2$ from $$\Gamma 1 = \mu_1 = \min \{_1A_{11}(R_1), {_1A_{10}}(R_2)\} \text{ [FIG. 9B]}$$

$$\Gamma 2 = \mu_2 = \min \{_2A_{20}(R_1), {_2A_{21}}(R_2)\} \text{ [FIG. 9C]}$$

The audio composite ratio of $\Gamma 1$, $\Gamma 2$ is similar in shape to the component membership function as shown in the simulation graph of FIG. 9A.

Consequently, the mobile unit is able to switch a composite output $e_1\Gamma_1+e_2\Gamma_2$ gently from the base station 1 to base station 2 and vice versa with the cell boundary $R_c$ as a perimeter, thus avoiding the momentary interruption of an audio output. As the membership function includes the cell boundary $R_c$, the soft hand-off is possible even though the mobile unit passes through any part of the cell boundary $R_c$ shown in FIG. 2. The position at which the inclination of the membership function ends is a design parameter and it is set at 95% and 105% of the cell boundary $R_c$, for instance.

If the soft hand-off method is used for the whole area of the cell, it would be uneconomical as the base stations 1, 2 are exclusively used for the whole time. Therefore, the soft hand-off method is naturally used after it is decided in accordance with the method described above that the starting position of inclination of the membership function has been reached. This system, when actually employed, is effective for a digital system applicable to both upward and downward circuits and still more effective if it is expanded into what synthesizes the audio signals of three base stations. In the digital system, however, receiving signals may be superimposed at all times so that membership functions can be superimposed one over the other. Fading may be decreased then because of the effect of diversity reception.

This system may also readily be expanded to a case where a cell boundary $R_c$ in the stepped portion within the building premises is curved, for instance.

Figure 1A:
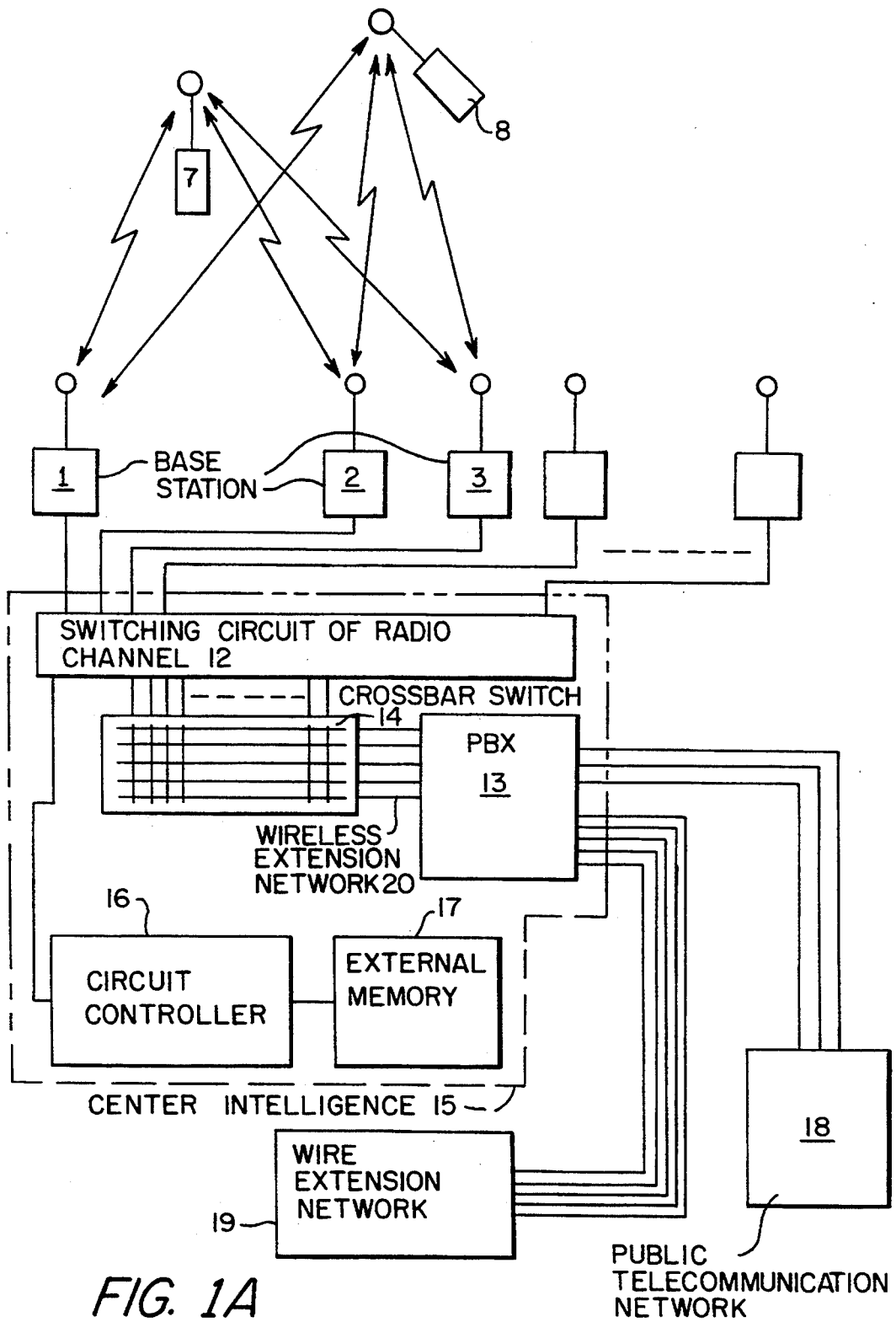
FIG. 1A shows an overall system for a mobile communication, according to the present invention.
Figure 1B:
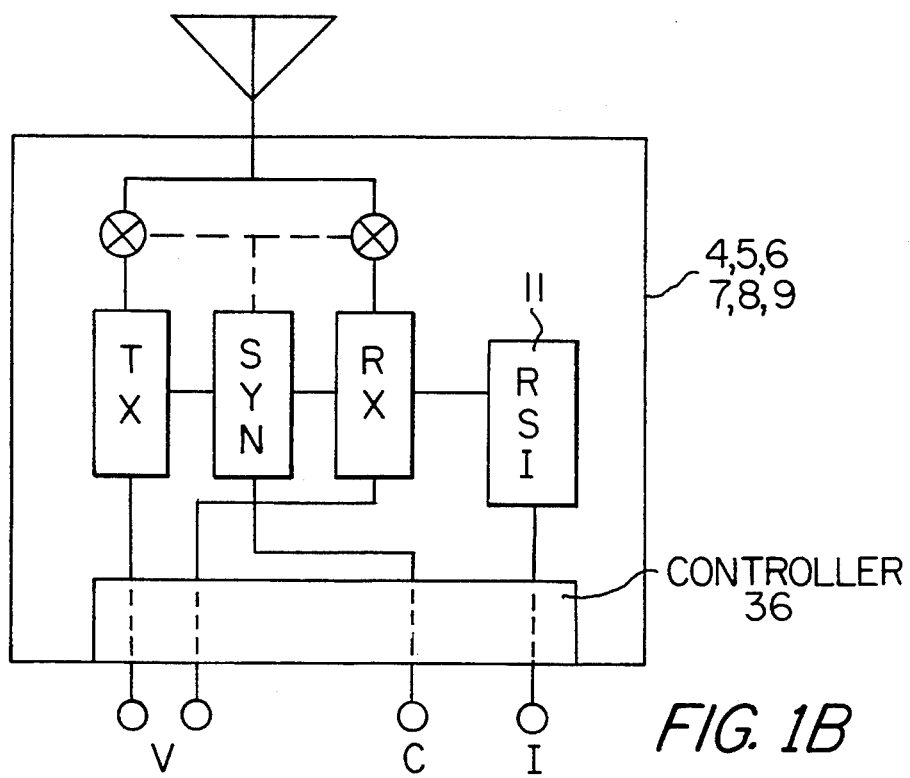
FIG. 1B shows in greater detail the structure of a mobile unit.
Figure 1C:
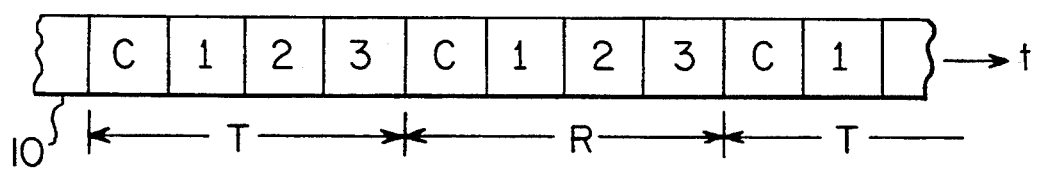
FIG. 1C shows a time slot of transmission and reception between mobile units and the base station with respect to time t.

In the system of FIG. 1, according to the present invention, there are a plurality of base stations 1, 2, 3 . . . and a plurality of mobile units 7, 8 . . . , with communications therebetween being held in a ping-pong fashion via a time slot 10 shown in FIG. 1C for transmission T and reception R. Each of the mobile units 4-9 is equipped with a transmitter TX, a receiver RX, a frequency synthesizer SYN and a radio signal strength indicator (RSI) 11, as indicated in FIG. 1B. Each of the terminals V, C, I of each mobile unit is connected as shown through a controller 36 to each of the base stations 1, 2, 3 . . . as shown in FIG. 1A each of the base stations is similar in construction to the mobile unit and has audio circuits equal to the number of talking channels of the time slot 10 and is connected to a radio channel switching circuit 12. The center intelligence 15 is arranged so that a radio extension network, such as a public network 18 or a wire extension network 19 is added to a private branch exchange 13 (PBX) and connected via a cross bar switch 14 to the radio channel switching circuit 12. The center intelligence 15 has circuit controller 16 that controls the cross-bar switch 14 to connect the call with a mobile unit to the private branch exchange 13. The circuit controller 16 converts the field strength measured by the base station and mobile unit into a field-strength-distance to calculate the position of the mobile unit and decide base station hand-off. Software necessary for computation and information that needs high speed processing is stored in an internal memory of the circuit controller 16, whereas information that does not need high-speed processing, such as an inherent identification number of the mobile unit is stored in an external memory 17. The selection of a vacant CH (c, 1, 2, 3 of FIG. 1C for transmission T or reception R of a mobile unit) is decided by each base station using the receiver in the base station and the radio signal strength indicator (RSI) 11, and each base station has a decision controller. The signal strength output of the receiver is normally used to measure the field strength. The output may be regarded as what is equivalent to the absolute value of the field strength.

A membership function generator for carrying out soft hand-off may be contained in either the loop circuit controller 16 or the radio channel switching circuit 12, and an audio signal delay error is less usual in the latter case.

By adding a display to the center intelligence of FIG. 1, the measured fields strength-distance R of the mobile unit is usable for displaying the position of each mobile unit. The prior learning of the cell boundary $R_c$ makes it possible to indicate the base station with which the mobile unit has registered its position and to display how far and in which direction the mobile unit is away from the base station, as well as to display a velocity vector for each mobile unit, if desired. When the center intelligence stores the field strength $E_c$ on the cell boundary $R_c$ and measuring coordinates (X,Y) on the map, accuracy in detecting the position is improved. As mentioned previously, the intelligence for these various functions may be contained in each of the base units, and/or in the mobile units, instead of the center intelligence being a unit separate from the mobile units and the base stations as specifically set forth in the preferred embodiment.

For the arrangement described so far, in which the cell boundary $R_c$ is learned beforehand and the position of the mobile unit is measured using a plurality of base stations, the position of the mobile unit can be indicated on this display of the center intelligence. The position of each base station and that of each mobile unit can also be indicated on the display, and particularly the velocity vector for each mobile unit may be displayed.

Moreover, the exceptional hand-off process necessitated by a complicated cell configuration is greatly reduced or eliminated and the operation software is also simplified according to the present invention. Further, a mobile unit that requires urgent hand-off is distinguishable by its velocity vector, which is measured, so that processing can be reduced and priority assigned to the various mobile units for switching.

If the soft hand-off is effected in the vicinity of the boundary $R_c$, particularly at a small distance from the boundary $R_C$, for example at 0.95 $R_C$ and 1.05 $R_C$, the operation of the exceptional process is made unnecessary and this results in simplifying the software, and further reduces the amount of soft hand-off processing as the boundaries for hand-off are narrow and somewhat uniform for the entire length of the cell boundary $R_c$. Simultaneously, the momentary interruption accompanied with hand-off is nullified and multi-pass fading is compressed. Therefore, facsimile and data communications are improved in quality.

Therefore, fuzzy logic control can be used for hand-off control and dynamic channel control as well as for learning the cell boundary $R_C$ and advanced hand-off control with respect to such learned cell boundary $R_c$. The fuzzy logic used herein, for example, is a decision process wherein inference rules are expressed in if-then form for a rule base using linguistic variables and membership functions that simplify the complicated algorithm when binary logic is used. The radio waves from many base stations can be used as sensor functions. The center intelligence of a radio PBX is blind, but can obtain the location of each mobile unit with accurate auditory sense and perform highly advanced control. With the autonomous learning of the cell boundary $R_C$, advanced hand-off controls are possible. The cell boundary $R_c$ is learned by sensing and storing the field strengths E as the mobile units are moved around after the base stations have been installed, and the determination of the cell boundary $R_c$ is repeatedly updated, to provide for automatic maintenance with respect to changing environmental conditions. Hand-off control uses the reliable learned cell boundary $R_c$ and therefore can avoid exceptional transactions caused by multi-pad fading. The measured cell boundary $R_c$ is quite different from the physical or geographical boundary $r_c$, because of multi-passfading of radio wave absorption and reflection due to obstructions, such as concrete walls, furniture, geological features, and the like.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. A mobile communication system, comprising:
a plurality of mobile units;
a plurality of base stations units;
means for providing two-way radio communication via radio channels between said the mobile units and said base station units;
said base station units being located to define a cell boundary of equal field strength of base station transmission radio communication between each two adjacent base station units;
means for determining and storing mobile unit positional data with a reference representing field strength of radio communications from said base station units and each of said mobile units; and
means for initiating switching, in response to the positional data, a mobile unit from a radio channel of one of said adjacent base stations to a radio channel of the other of the adjacent base station units that belong to the cell boundary in response to determining that the mobile unit has crossed the cell boundary in the direction of said one to said other of the adjacent base station units and the field strength of the one of said adjacent base stations has thereafter decreased a fixed threshold amount that is sufficient to provide hysteresis in the switching with respect to the cell boundary.

2. The system of claim 1, wherein said means for storing uses the cell boundary as the reference.

3. The system of claim 2, wherein each of said base stations has means for measuring a line of equal field strength for the radio communication of the two adjacent base stations to the mobile units as the cell boundary.

4. The system of claim 1, wherein each of said base stations has means for measuring a line of equal field strength for the radio communication of the two adjacent base stations to the mobile units as the cell boundary.

5. The system of claim 1:
wherein each of said base stations include means for measuring and storing field strength data of the radio communication with the mobile units and updating the same continuously; and
each of said base stations include means for repeatedly determining the positional data of each mobile unit relative to the base stations in response to the updating of stored field strength data and with respect to the cell boundary.

6. The system of claim 5, including means for comparing the positional data of each of the mobile units over time for more than one of said base stations and thereby determining a velocity vector for each mobile unit.

7. A mobile communication system, comprising:
a plurality of mobile units;
a plurality of base stations units;
means for providing two-way radio communication via radio channels between said the mobile units and said base station units;
said base station units being located to define a cell boundary of equal field strength of base station transmission radio communication between each two adjacent base station units;
means for determining and storing mobile unit positional data with a reference representing field strength of radio communications from said base station units and each of said mobile units;
means for switching, in response to the positional data, a mobile unit from a radio channel of one of said adjacent base stations to a radio channel of the other of the adjacent base station units that belong to the cell boundary;
said means for determining and storing positional data continuously updating the positional data; and
fuzzy reasoning means for continuously updating the cell boundary between the adjacent base stations according to a membership function of an audio signal composite ratio obtainable from the positional data.

8. A mobile communication system, comprising:
a plurality of mobile units;
a plurality of base stations units;
means for providing two-way radio communication via radio channels between said the mobile units and said base station units;
said base station units being located to define a cell boundary of equal field strength of base station transmission radio communication between each two adjacent base station units;
means for determining and storing mobile unit positional data with a reference representing field strength of radio communications from said base station units and each of said mobile units;
means for switching, in response to the positional data, a mobile unit from a radio channel of one of said adjacent base stations to a radio channel of the other of the adjacent base station units that belong to the cell boundary;
said means for determining and storing continuously updating the positional data from field strengths of the two adjacent base stations; and
means, in response to the updated positional data, for repeatedly determining the cell boundary between two adjacent base stations where the respective field strengths are equal and storing the location of the cell boundary as an equistrength field cell boundary.

9. The system of claim 8, wherein said means for switching transferring a mobile unit from a channel of one of said adjacent base stations to a channel of the other of said adjacent base stations when the field strength of the radio communication of said one base station falls a substantial amount below the set reference value as received by the mobile unit, and similarly transferring a mobile unit from a channel of the other of said adjacent base stations to a channel of said one of the base stations when the field strength of the radio communication of said other base station falls a substantial amount below the set reference value as received by the mobile unit, with the substantial amount being sufficient to provide hysteresis in the transferring to overcome instability in the transferring.

10. The system of claim 8, wherein each of said base stations include means for measuring and storing field strength data of the radio communication with the mobile units and updating the same continuously.

11. A mobile communication system, comprising:
a plurality of mobile units;
a plurality of base stations units;
means for providing two-way radio communication via radio channels between said the mobile units and said base station units;
said base station units being located to define a cell boundary of equal field strength of base station transmission radio communication between each two adjacent base station units;
means for determining and storing mobile unit positional data with a reference representing field strength of radio communications from said base station units and each of said mobile units;
means for switching, in response to the positional data, a mobile unit from a radio channell of one of said adjacent base stations to a radio channell of the other of the adjacent base station units that belong to the cell boundary;
means for comparing the positional data of each of the mobile units over time for more than one of said base stations and thereby determining a velocity vector for each mobile unit;
means responsive to the positional data and the velocity vector of each of said mobile unbits and further responsive to the cell boundary for determining a mobile unit among the mobile units most urgently in need of switching from the channel of one base station to the channelof another adjacent base station and producing a corresponding urgency determination; and
said means for switching being responsive to the urgency determination.

12. A mobile communication system, comprising:
a plurality of mobile units;
a plurality of base stations units;
means for providing two-way radio communication via radio channels between said the mobile units and said base station units;
said base station units being located to define a cell boundary of equal field strength of base station transmission radio communication between each two adjacent base station units;
means for determining and storing mobile unit positional data with a reference representing field strength of radio communications from said base station units and each of said mobile units;
means for switching, in response to the positional data, a mobile unit from a radio channel of one of said adjacent base stations to a radio channel of the other of the adjacent base station units that belong to the cell boundary; and
fuzzy reasoning means responsive to the positional data for continuously determining the cell boundary between adjacent base stations.

13. A mobile communication system, comprising:
a plurality of mobile units;
a plurality of base station units;
means for providing two-way radio communication via radio channels between said mobile units and said base station units;
means for storing data defining a cell boundary between two adjacent base station units;
means for determining the position of each mobile unit relative to an adjacent cell boundary;
means for initiating switching one mobile unit from a radio channel of one of said adjacent base station units to a radio channel of the other of said adjacent base station units that belong to the cell boundary when the one mobile unit has crossed the cell boundary and moved toward the other of the adjacent base station units that belong to the cell boundary by a fixed threshold amount away from the cell boundary that is sufficient to provide hysteresis in the switching with respect to the cell boundary.

14. The mobile communication system according to claim 13, wherein said fixed threshold amount is a percentage of the filed strength of radio transmission.

15. The mobile communication system according to claim 13, wherein said fixed threshold amount is a fixed field strength amount of radio transmission.

16. The mobile communication system according to claim 13, wherein the cell boundary is an equal field strength line of radio communications between the two adjacent base station units.

17. The mobile communication system according to claim 13, wherein said cell boundary is fixed.

18. The mobile communication system according to claim 13, further including means for repeatedly gathering and storing updated information of field strength of radio transmission from said base station units to said mobile units relative to positions of said mobile units and repeatedly updating the position of the cell boundary in accordance with the updated information of field strength.

19. A mobile communication system, comprising:
a plurality of mobile units;
a plurality of base station units;
means for providing two-way radio communication via radio channels between said mobile units and said base station units;
means for storing data defining a cell boundary between each two adjacent base station units;
means for repeatedly determining updated positional data of each mobile unit relative to an adjacent cell boundary;
means for switching a mobile unit from a radio channel of one of said adjacent base station units to a radio channel of the other of said adjacent base station units that belong to the cell boundary in response to the cell boundary and the positional data; and
further including means for repeatedly gathering and storing updated information of field strength of radio communication between said base station units and said mobile units relative to positions of said mobile units and for repeatedly updating the stored cell boundary in accordance with the updated information of field strength.

20. A mobile communication system, comprising:
a plurality of mobile units;
a plurality of base station units;

means for providing two-way radio communication via radio channels between said mobile units and said base station units;

means for determining positional data of each mobile unit;

means for comparing positional data of each mobile unit at different times thereby determining and storing a velocity vector for each of said mobile units;

means for specifying at least one mobile unit needing urgent hand-off from among said mobile units on the basis of said velocity vectors;

means for normally switching each mobile unit from a radio channel of one of said base station units to a radio channel of another of said base station units on the basis of said positional data; and means for priority switching said one mobile unit in priority over others of said mobile units from a radio channel of one of said base station units to a radio channel of another of said base station units in response to said means for specifying.

21. The mobile communication system of claim 20, wherein said means for normally switching performs soft hand-off type switching by switching each mobile unit having a received field strength of the one base station fall a fixed threshold value below a fixed field strength to the another of said base stations having a received field strength at least at the fixed field strength to provide hysteresis in the switching.

22. A mobile communication system, comprising:
a plurality of mobile units;
a plurality of base station units;
means for providing two-way radio communication via radio channels between said mobile units and said base station units;
means for repeatedly determining updated positional data of each mobile unit;
means for switching a mobile unit from a radio channel of one of said adjacent base station units to a radio channel of the other of said adjacent base station units in response to the positional data and in preference to other mobile units based upon a switching priority urgency value;
means for repeatedly comparing the updated positional data for each mobile unit over time to determine a velocity of movement of each of said mobile units; and
in response to the velocity of each of said mobile units, individually changing the switching priority urgency value and individually changing the frequency of updating the positional data for the corresponding mobile unit so that the switching occurs more quickly and the updating occurs more frequently for higher velocity mobile units.

23. The mobile communication system according to claim 22, wherein the velocity includes a velocity vector for each of said mobile units.

24. A mobile communication system, comprising:
a plurality of mobile units;
a plurality of base station units;
means for providing two-way radio communication via radio channels between said mobile units and said base station units;
means for storing data defining a cell boundary between each two adjacent base station units;
means for determining positional data of each mobile unit relative to an adjacent cell boundary;
means for switching a mobile unit from a radio channel of one of said adjacent base station units to a radio channel of the other of said adjacent base station units that belong to the cell boundary in response to an urgency value unique to each of said mobile units; and
means responsive to the positional data for determining the urgency value correlated to time for each mobile unit to reach a position for switching by said means for switching.

* * * * *